United States Patent [19]  [11] Patent Number: 4,948,013
Thomas et al.  [45] Date of Patent: Aug. 14, 1990

| [54] | METHOD AND APPARATUS FOR DISPENSING POWDERED PESTICIDE |
|---|---|
| [75] | Inventors: John E. Thomas, River Falls, Wis.; Haresh C. Lakhan, Eagan, Minn. |
| [73] | Assignee: Ecolab Inc., St. Paul, Minn. |
| [21] | Appl. No.: 339,055 |
| [22] | Filed: Apr. 14, 1989 |

Related U.S. Application Data

[63] Continuation-in-part of Ser. No. 49,710, May 13, 1987, Pat. No. 4,867,341.

[51] Int. Cl.$^5$ .............................................. B67B 7/00
[52] U.S. Cl. ........................................ 222/1; 222/630; 222/195; 222/396; 222/464; 222/529; 406/38; 406/90; 406/146; 239/310
[58] Field of Search ................ 222/1, 630, 195, 396, 222/529, 464; 406/38, 90, 146, 136, 141; 239/310, 315, 316

[56] References Cited

U.S. PATENT DOCUMENTS

| 2,327,337 | 8/1943 | Burch | 406/146 X |
|---|---|---|---|
| 2,501,047 | 3/1950 | Gustafsson et al. | 406/136 |
| 2,586,761 | 2/1952 | Eskola | 119/157 |
| 2,922,586 | 1/1960 | Hardinge | 241/19 |
| 2,924,489 | 2/1960 | Beckmann | 406/146 X |
| 3,004,721 | 10/1961 | Notzold | 241/5 |
| 3,168,254 | 2/1965 | Kilboy | 241/19 |
| 3,524,594 | 8/1970 | Anderson | 241/19 |
| 3,542,298 | 11/1970 | Klesskalt | 241/19 |
| 4,364,521 | 12/1982 | Stankowitz | 239/397 X |
| 4,371,295 | 2/1983 | Hart | 406/128 |
| 4,474,327 | 10/1984 | Mattson et al. | 406/38 X |
| 4,561,598 | 12/1985 | Musschoot | 241/19 |
| 4,600,129 | 7/1986 | Kondo | 406/38 X |
| 4,678,377 | 7/1987 | Bouchard | 222/630 |
| 4,867,341 | 9/1989 | Thomas | 222/1 |

FOREIGN PATENT DOCUMENTS 980431 1/1965 United Kingdom ................ 406/146

Primary Examiner—Joseph J. Rolla
Assistant Examiner—Gregory L. Huson
Attorney, Agent, or Firm—Merchant, Gould, Smith, Edell, Welter & Schmidt

[57] ABSTRACT

Disclosed is a method and apparatus (10) for dispensing powdered pesticide (13). A housing (11) is separated into an upper chamber (12) and lower chamber (51) by a porous media layer (19). The powdered pesticide (13) is contained within the upper chamber (13) and is fluidized when compressed air enters the dispenser from air inlet line (18). The fluidized pesticide is dispensed through adjustable dip tube (26), outlet line (34) and nozzle (36) when a control valve (50) is activated. Only particles having a size smaller than a predetermined size are dispensed; the remaining, relatively large pesticide particles remain in the upper chamber until physically removed.

11 Claims, 5 Drawing Sheets

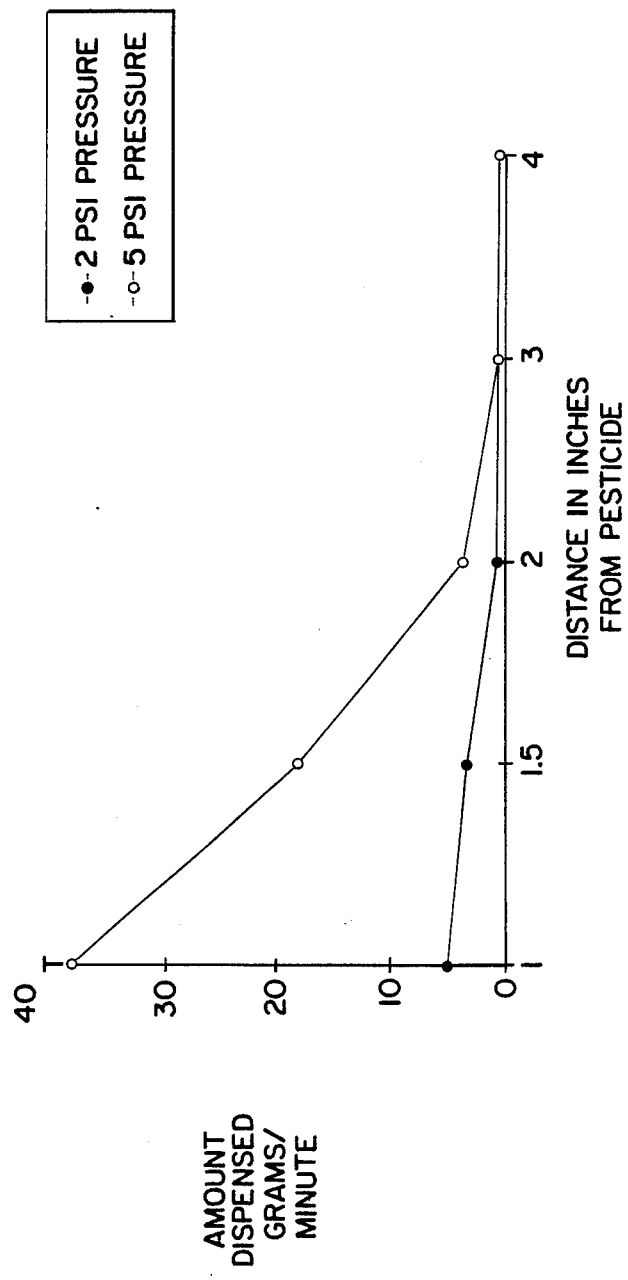

METHOD AND APPARATUS FOR DISPENSING POWDERED PESTICIDE

This is a continuation-in-part application of U.S. Pat. Application Ser. No. 07/049,710, filed May 13, 1987 issued Sept. 19, 1989 as U.S. Pat. No. 4,867,341.

FIELD OF THE INVENTION

The present invention relates to dispensers for powdered pesticide, and more particularly to an apparatus for dispensing fluidized powdered pesticide particles of a desired size.

BACKGROUND OF THE INVENTION

Pests and insects can adversely affect the livableness, health and sanitation of areas in which humans live and work. Cockroaches in particular have become common household pests. Cockroaches can chew foodstuffs, clothing, paper, and even plastic insulation. Cockroaches can also produce allergenic reactions in humans and can emit a highly disagreeable odor. Thus, it is desirable to be able to eliminate cockroaches and other pests efficiently, inexpensively, and with no adverse effects to humans or pets.

Boric acid has been proven to be a common, effective pesticide which is safe and non-toxic to humans. The powdered boric acid works by attaching itself to the insect's body. The insect then ingests or licks the boric acid when cleaning itself. The boric acid particles also act to abrade the insect's outer body, causing the insect to dehydrate. Silica gel and boric acid containing pyrethin can also be used.

Dispensers are available which dispense powdered boric acid through wand and into cracks and crevices. However, conventional dispensers of boric acid exhibit several operational disadvantages. Typically, they dispense too much pesticide, dispensing great quantities of pesticide and very little air. Some dispensers also dispense a large amount of pesticide alternated by blasts of air, rather than a controlled, uniform pesticide-air mixture. These conventional dispensers are consequently less effective, because they result in wasted pesticide and "piles" of pesticide which the insects avoid.

Another problem with conventional dispensers is that they do not segregate the boric acid by particle size and therefore they dispense relatively large particles. These oversized particles are too large to attach to the cockroach's or insect's body and are consequently ineffective and wasteful.

The dispensers currently available also sometimes get wet inside and are prone to plugging. This requires the operator to disassemble the dispenser, a procedure which is inconvenient and time consuming.

SUMMARY OF THE INVENTION

The present invention addresses many of the above difficulties with conventional pesticide dispensers. According to one aspect of the present invention, there is an apparatus for dispensing powdered pesticide. The dispenser includes a hollow housing which is separated into an upper and lower chamber by a porous media layer. An aperture in the lower chamber admits pressurized air from an air inlet line. Powdered pesticide is contained within the upper chamber and is fluidized by the pressurized air. Means for outletting the fluidized pesticide are included to deliver the pesticide to the utilization point and may be adjusted for the desired application. The apparatus dispenses only pesticide particles having a particle size smaller than a predetermined size, and particles larger than that predetermined size are retained in the upper chamber.

According to another aspect of the invention, there is disclosed a method for dispensing powdered pesticide. The method includes: placing the powdered pesticide in the dispenser's upper chamber, supplying pressurized air, fluidizing the powdered pesticide in the upper chamber, and blowing the pesticide particles having a particle size smaller than a predetermined size through the outlet. Another aspect of the inventive method is the removal of the dispenser particles having a particle size larger than the predetermined size, grinding the remaining large particles, and then reintroducing the ground particles into the dispenser of the present invention.

According to yet another aspect of the invention, there is disclosed an apparatus for dispensing powdered pesticide including a hollow housing having an upper and lower chamber with an inlet orifice in fluid communication with the lower chamber and an outlet orifice in fluid communication with the upper chamber. The horizontal porous plastic media is positioned within the housing to separate the housing into the upper and lower chambers. Pesticide is contained within the upper chamber. Means for inletting pressurized air through the inlet orifice and into the lower chamber are included. The air flows through the porous media in a substantially vertical direction and fluidizes the pesticide in the upper chamber. Means for outletting the pesticide from the outlet orifice to a utilization point are included where pesticide particles having a particle size smaller than a predetermined size are dispensed and particles having particle size larger than the predetermined size are retained in the upper chamber. Further included are means for adjusting the outlet means where the outlet means may be moved relative to the level of the pesticide in the upper chamber.

According to another aspect of the invention, there is disclosed a method for dispensing powdered pesticide. The method includes: placing a quantity of powdered pesticide in an upper chamber of a dispenser where the pesticide is supported upon a porous media which forms a bottom for the upper chamber, adjusting an outlet relative to the level of the pesticide, supplying pressurized air to a lower chamber of the dispenser so as to fluidize the powdered pesticide in the upper chamber by air flow through the porous media and into the upper chamber, and blowing pesticide particles having a particle size smaller than a predetermined size through the outlet, where particles having a particle size larger than a predetermined size remain in the upper chamber.

Another aspect of the inventive apparatus includes a dip tube having an upper end connected to the outlet tube and a lower end having a plurality of apertures which are in fluid communication with the upper chamber, the position of the dip tube being adjustable by means of a collet assembly.

An important advantage of the present invention is its ability to segregate particles of powdered pesticide so that only the desired sized particles are dispensed. By dispensing only small, fine particles of boric acid, a fine layer or dusting is produced on the surface of the floor or wall. The insects unknowingly walk through the thin layer of pesticide, so that the small particles effectively attach to the insects' outer body.

Another feature of the present invention is that it dispenses an appropriate, controlled amount of pesticide. The construction of the present invention allows the user to adjust the apparatus to dispense a proper air-to-pesticide ratio, thus eliminating waste and "piles" of pesticide which the insects will avoid.

Yet another advantage of the present invention is that the dispensing rate is adjustable. This allows the user to choose a dispensing rate that is appropriate at the pressure desired and for the particular job requirements. This feature eliminates waste of pesticide and allows greater control over the apparatus and quantity of pesticide used.

The dispenser of the present invention is also simple in construction and relatively inexpensive. Because of its construction and the flow of air therethrough, plugging problems are minimized and the operator need not periodically disassemble the dispenser. Consequently, the pest technician can complete his job in a minimum amount of time.

These and other objects of the invention will become apparent from a consideration of the following specification and accompanying drawings which form a part of this application.

In carrying out the objects of the invention, it is to be understood that its essential features are susceptible to change in design and structural arrangement, with only one preferred and practical embodiment being illustrated in the accompanying drawings, as required.

BRIEF DESCRIPTION OF THE DRAWINGS

In the accompanying drawings, wherein like numerals of reference appear to similar parts throughout:

FIG. 6 is a graph illustrating the rate of pesticide dispensed in relation to the distance between the dip tube and the pesticide at various pressures.

DESCRIPTION OF THE PREFERRED EMBODIMENT

Figure 1:
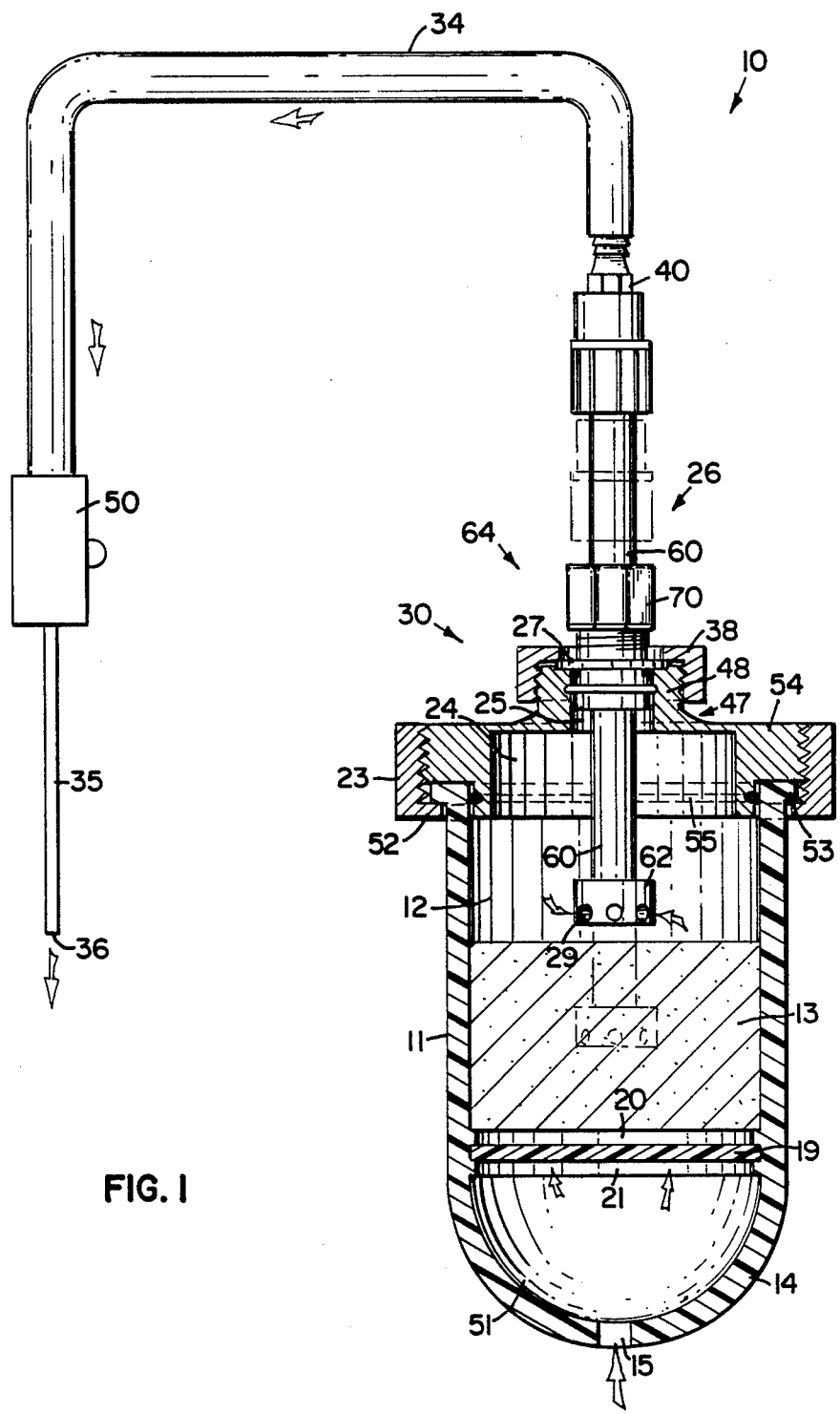
FIG. 1 is a side view, partially in section, of the pesticide housing for the dispensing apparatus of the present invention.

The pesticide dispenser of the present invention is shown generally at 10. It includes a substantially hollow housing or bowl 11 which is divided into an upper chamber 12 and a lower chamber 51. In the preferred embodiment, the housing 11 is elongated in the vertical direction and has a circular cross-section, with its lower end 14 being concave. The housing 11 is streamlined and contoured to facilitate airflow therethrough. The upper end of the housing 11 is a large opening 55, which is closed off by an outlet assembly 30. When pesticide 13 is loaded into the housing 11, it goes through the opening 55 after the outlet assembly 30 has been removed. Preferably, the housing 11 is made of a lightweight plastic material which is substantially transparent. In the preferred embodiment, the length of the housing 11 is approximately eight (8) inches, with a diameter of approximately four (4) inches.

Figure 3:
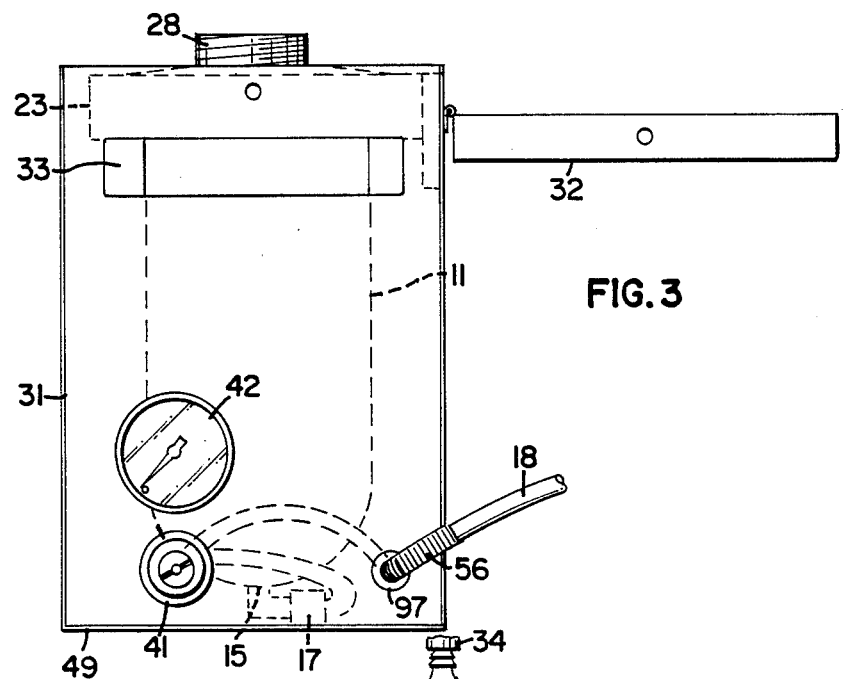
FIG. 3 is a side elevational view of the dispenser container for the dispensing apparatus of the present invention, with the pesticide housing shown in phantom.
Figure 4:
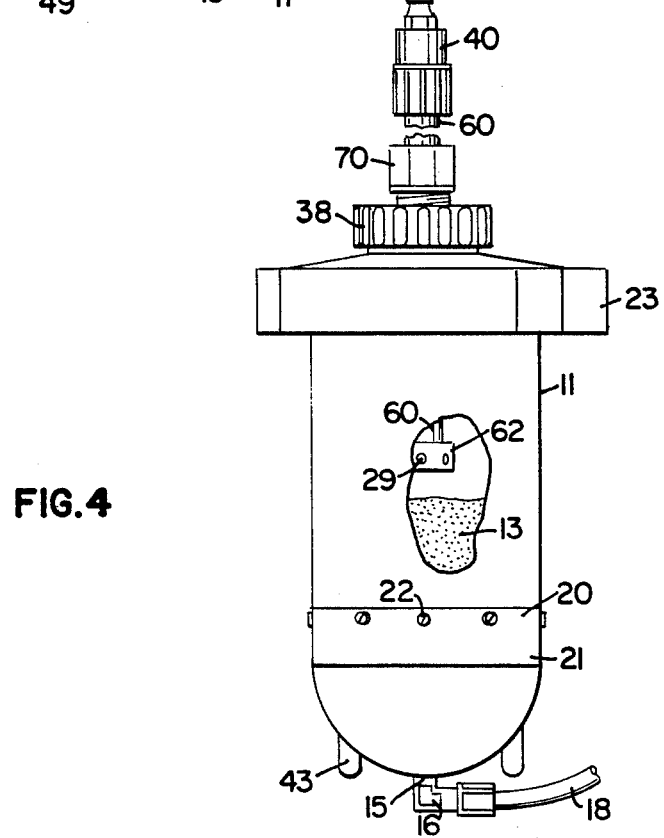
FIG. 4 is a side elevational view of the pesticide housing shown in FIG. 1.

The lower end 14 of the housing 11 includes an inlet orifice 15. An L-shaped adapter 16 is attached to the housing 11 and extends through the inlet orifice 15. The opposite end of the adapter 16 is interconnected through a threaded joint 17 to an air line 18, as shown in FIGS. 3 and 4.

Figure 2:
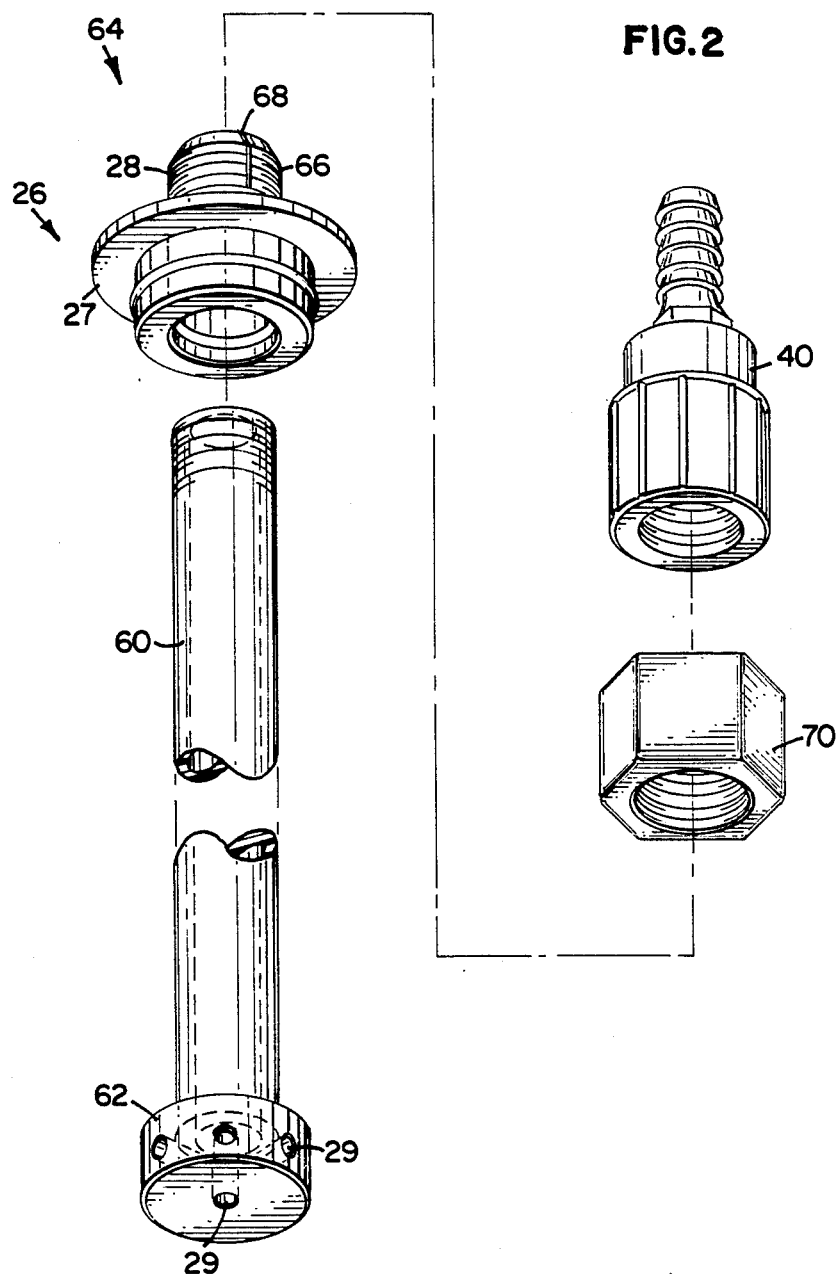
FIG. 2 is an exploded perspective view of the dip tube of the present invention.

The upper and lower chambers 12, 51 are separated by a transverse, flat, porous media 19, so that the media 19 constitutes the bottom of the upper chamber 12 and the top of the lower chamber 51. In the preferred embodiment, the longitudinal axis of the housing 11 is substantially vertical, whereas the porous media 19 is horizontal. The porous media 19 extends across the entire cross-section of the housing 11. Preferably, the porous media 19 is made of a porous plastic material. As shown in FIGS. 1 and 2, the porous media 19 is positioned approximately one-third of the length of the housing 11 from the housing's lower end 14, so that the upper chamber 12 is larger than the lower chamber 51. The porous media 19 is positioned within the housing 11 by means of upper 20 and lower 21 supports. The supports 20, 21 are preferably annular, plastic rings whose diameter is slightly less than the diameter of the housing 11. The outside wall of each annular support 20, 21 is positioned flush against the inside wall of the housing 11 and is securedly attached at the desired location by means of suitable fasteners 22, such as screws.

Contained within the upper chamber 12 is a powdered pesticide 13. In the preferred embodiment, the powdered pesticide 13 is boric acid. Before the pesticide dispenser 10 is activated, the pesticide 13 is supported by the porous media 19 which constitutes the bottom of the upper chamber 12.

The outlet assembly 30 of the housing 11 includes a substantially horizontal cylindrical locking ring 23 which is larger than the diameter of the housing 11. The locking ring 23 acts to hold a top ring 47 in place on the housing. The lower edge of the locking ring 23 has an extension portion 52 which is positioned against the underside of the lip 53 of the housing or bowl 11, as shown in FIG. 1. The inner surface of the locking ring 23 is threaded around its circumference to accommodate the outer threads on the top ring 47. The locking ring 23 includes a plurality of knobs 46 which facilitate gripping of the locking ring 23 when screwing or unscrewing.

The top ring 47 has a lower, large cylindrical base 54 and an integral upper, smaller cylindrical portion 48. The base 54 acts as a cap upon the upper opening 55 of the housing 11 and has a diameter approximately equal to the diameter of the housing 11. The outer surface of the base portion 47 is threaded to accommodate the locking ring 23, and the outer surface of the cylindrical portion 48 is threaded to accommodate a top cap 38. The top ring 47 includes a lower large cylindrical opening 24 and an upper smaller cylindrical opening 25 within the large and small cylindrical portions 54, 48 respectively.

Insertable within the opening 25 is a hollow, generally cylindrical dip tube 26 which has a diameter slightly smaller than the opening 25. The dip tube 26 includes pipe 60, a pick-up probe 62, and adjustment means 64. The pipe 60 is of a predetermined length, depending upon the size of the dispenser 10, but is approximately 7 inches in length in the preferred embodiment. In the preferred embodiment, the pipe 60 is made of a material such as PVC. The pick-up probe 62 is cooperatively connected to the pipe 60 at its lower end. The pick-up probe 62 includes a plurality of radial holes 29 around the circumference of the probe 62 and on the bottom thereof. The adjustment means 64 is sized and configured to slideably receive pipe 60. The adjustment means 64 includes a substantially horizontal, annular flange 27 and collect assembly 28 which includes threads 66 and slits 68. A collect nut 70 is operatively connected to the collect assembly 28 by threads 66.

The annular ring 27 when used in conjunction with outlet assembly 30 fixes the dip tube 26 in the pesticide housing 11. The adjustment means 64 may then be utilized to adjust the dip tube 26 so that the pick-up probe 62 may be moved a desired distance to or from the pesticide 13 in the upper chamber 12. The collect nut 70, when in a loosened position on collect assembly 28, allows the pipe 60 to slide within the collect assembly 28 and annular ring 27, thereby adjusting the height of the dip tube 26 and more particularly, adjusting the height of the pick-up probe 62 in relation to the pesticide 13.

The adjustable dip tube 26 allows control of the dispensing rate. Because the dip tube 26 may be adjusted to a specified distance from the pesticide 13, the amount of pesticide 13 dispensed in grams per minute is controlled. The user may adjust the dip tube 26 for the appropriate application of pesticide 13.

Referring now to FIG. 6, if the dip tube 26 is placed 1 inch from the pesticide 13 and the pressure of the air flow is set at 2 psi, approximately 5 grams per minute of pesticide 13 is distributed. If the dip tube 26 is placed 2 inches from the pesticide 13 at the same pressure setting, approximately 1 gram per minute of pesticide 13 is dispensed. Much different results are achieved when the pressure is set at 5 psi. At a pressure of 5 psi, if the dip tube is placed 1 inch from the pesticide 13, 38 grams per minute of pesticide is dispensed. If the dip tube 26 is placed 1.5 inches from the pesticide at 5 psi pressure approximately 18 grams per minute of pesticide will be dispensed. In the preferred embodiment, the optimum operating pressure for the apparatus disclosed is in the range of 2 to 5 pounds per square inch or psi. This optimum range gives the user the best control and least waste of pesticide in the desired application.

The present invention also includes a container 31 for the dispenser housing 11 which serves to protect its components. The container 31 preferably has a flat bottom 49 and a hinged lid 32 at its upper end. The container 31 has one or more handles 33, which makes the pesticide dispenser 10 of the present invention portable for the pest technician. In the preferred embodiment, the container 31 is made of a lightweight yet sturdy material such as stainless steel.

The locking ring 23 and top ring 47 are preferably removed for easy filling of the upper chamber 12 with the pesticide 13 through the opening 55. They are then replaced and the outlet assembly 30 reassembled before operation.

Connected with the outlet assembly 30 is an outlet tube 34. Suitable fasteners 40 are used to interconnect the outlet assembly 30 to the outlet line 34. In the preferred embodiment, the fastener 40 has a barb fitting connected to the top of pipe 60 on dip tube 26. The outlet tube is preferably of sufficient length so that the pest technician can set down the container 31 periodically during the dispensing operation. The distal end of the outlet tube 34 is preferably a wand 35 having a nozzle 36 of the type which is conventional for dispensing pesticides. A control valve 50 is interconnected between the outlet line 34 and wand 35 to regulate the flow of the pesticide 13 as desired.

Figure 5:
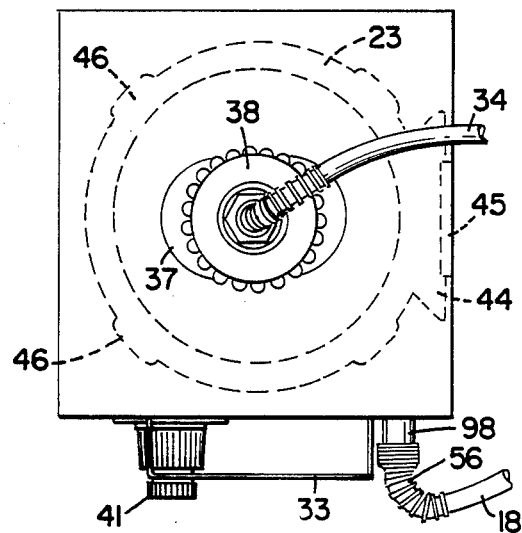
FIG. 5 is a top view of the pesticide container shown in FIG. 3 with the pesticide housing shown in phantom.

As is shown in FIG. 5, the hinged lid 32 of the container 31 includes a substantially oval opening 37. After the outlet assembly 30 is positioned in place upon the top of the housing 11, the hinged lid 32 of the container 31 is closed so that the outlet assembly 30 extends through the opening 37 in the lid 32. The top cap 38 is then screwed on the cylindrical portion 48 of the outlet assembly until the bottom of the cap 48 is flush against the lid 32. The diameter of the cap 38 is larger than the width of the aperture 37 in the lid. In this manner, the housing 11 is securely positioned within the container 31. The cap 38 is annular, and has a shoulder portion 39 which mates against the annular lip 27 of the dip tube 26.

The air inlet line 18 communicates with an aperture 97 in the lower part of the container 31. In the preferred embodiment, the container 31 includes proximate its bottom an integral tube 98 extending outside the container 31 for receipt of the air inlet tube 18. A suitable fastener 56 is used to interconnect the inlet tube 18 with the tube 98. Preferably, the air inlet line 18 is regulated by a pressure regulator 41 and gauge 42 mounted on the side of the container 31. As shown in FIG. 3, the air inlet line 18 runs through the regulator 41 before entering the inlet orifice 15 at the bottom of the housing 11.

The position of the pesticide housing 11 is maintained within the container 31 by means of a flange 45 connected to the inside of one of the container's side walls. The locking ring 23 includes an extension portion 44 which inserts within the flange 45. The flange 45 and extension portion 44 are sized and shaped compatibly so that the housing 11 does not move within the container 31. The housing 11 also includes a plurality of legs 43 for supporting the device on the bottom of the container 31.

In operation, the powdered pesticide 13 is loaded into the upper chamber 12 (as shown in FIGS. 1, 2 and 4) and the outlet assembly 30 and dip tube 26 are positioned in place. The dip tube 26 is adjusted to a predetermined distance from the pesticide 13 by loosening collet nut 70. Loosening collet nut 70 allows the slits 68 in the collet assembly 28 to expand and thereby allows the pipe 60, when moved in a vertical direction, to slide within the collet assembly 28. The user slides the pipe 60 to the desired distance from the pesticide 13 and then tightens collet nut 70 onto threads 66 of the collet assembly 28 narrowing slits 68 and tightening the collet assembly 28 so that the pipe 60 is fixed.

Adjustment of the dip tube 26 relative to the pesticide 13 allows the user to control the rate of pesticide 13 dispensed. Therefore, the amount of pesticide 13 dispensed in, for example, grams per minute may be increased or decreased depending on the needs of the user. The adjustable dip tube 26 provides the user with a range of dispensing rates which are helpful for different types of dusting. For example, if a hole is drilled in a wall and the entire inner portion of the wall is to be covered with pesticide 13, the dip tube 26 may be placed as close to the pesticide 13 as is optimal so that a greater dispensing rate is utilized to cover the entire inner surface of the wall. However, if the application is to be directed to a smaller crack or crevasse, the dip tube 26 may be placed at a greater distance from the pesticide 13 so that the dispensing rate and stream of pesticide 13 is smaller and more easily controlled. The position of the dip tub 26 in relation to the pesticide is shown in solid and phantom in FIG. 1.

When the dip tube 26 is adjusted, compressed air is then directed through the air inlet line 18 at the desired air pressure and maintained by the regulator 41. The air enters the lower chamber 51 and passes upward through the layer of porous media 19 and into the powdered pesticide 13. The air then acts upon the pesticide 13 to form a fluidized bed of material, in which the particles of pesticide are suspended in the air. The fluidized pesticide materials are forced to pass through the dip tube 26 and outlet assembly 30 into the outlet line 34.

However, only pesticide particles having a size smaller than a predetermined size pass outside the upper chamber 12 and are dispensed. Particles having a larger than predetermined size remain in the upper chamber 12 and are maintained there by the force of gravity. But the smaller pesticide particles are carried by the air into the outlet line 34. By allowing only the smaller particles to go up into the outlet assembly 30 and out the nozzle 36, no large "chunks" of pesticide are dispensed, and a fine layer or dusting of pesticide is produced, which is highly effective against pests such as cockroaches.

The user positions the nozzle 36 on the wand 35 at the desired utilization point. The operator then actuates the control valve 50 which allows a controlled amount of fluidized pesticide to exit through the nozzle 36. The valve 50 remains open as long as desired, as the operator moves the wand 35 and nozzle 36 along cracks and crevices.

Eventually, all of the smaller pesticide particles will be dispensed in this fluidized state, and only the particles which are relatively large will remain in the upper chamber 12. Although air may continue to flow through the device for an extended period of time, there will be insufficient air pressure to transport the large, undesirable pesticide particles into the outlet line 34. Thus, after all of the small, desirable particles have been dispensed, only air will flow through the outlet line, not the large particles. At this point, therefore, the air pressure can be deactivated and the outlet assembly 30 can be removed from the top of the upper chamber 12. The large remaining particles can then be removed. The large pesticide particles can either be disposed of or ground to a smaller size and then reintroduced into the dispenser.

It is to be understood that numerous and various modifications can be readily devised in accordance with the principles of the present invention by those skilled in the art without departing from the spirit and scope of the invention. Therefore, it is not desired to restrict the invention to the particular construction illustrated and described, but to cover all modifications that may fall within the scope of the appended claims.

What is claimed is:

1. An apparatus for dispensing powdered pesticide comprising:
   (a) a hollow housing having an upper and lower chamber, an inlet orifice being in fluid communication with said lower chamber, and an outlet orifice being in fluid communication with said upper chamber;
   (b) a transverse porous media positioned within said housing so as to separate said housing into said upper chamber and said lower chamber, said pesticide being contained within said upper chamber;
   (c) adjustment means for adjusting the position of said outlet orifice within said upper chamber; and
   (d) means for inletting pressurized air through said inlet orifice, into said lower chamber, wherein said air blows through said porous media and fluidizes said powdered pesticide in said upper chamber, wherein said pressurized air from said inlet orifice directs particles into said outlet orifice, the particles to be dispensed being particles which are fluidized so as to be proximate said outlet orifice.

2. The apparatus according to claim 1, wherein said porous media is made of a porous plastic material.

3. The apparatus according to claim 1, further comprising an outlet tube operatively connected through an upper end of said housing, said outlet tube including a control valve, wherein powdered pesticide is dispensed when said control valve is activated.

4. The apparatus according to claim 3, wherein said adjustment means includes a dip tube having an upper end operatively connected to said outlet tube, and a lower end having a plurality of apertures which are in fluid communication with said upper chamber, the position of said dip tub being adjustable by means of a collect assembly.

5. An apparatus for dispensing powdered pesticide, comprising:
   (a) a hollow housing having an upper and lower chamber, an inlet orifice being in fluid communication with said lower chamber, and an outlet orifice being in fluid communication with said upper chamber;
   (b) a horizontal porous plastic media positioned within said housing so as to separate said housing into said upper chamber and said lower chamber, said pesticide being contained within said upper chamber;
   (c) means for inletting pressurized air through said inlet orifice and into said lower chamber, wherein said air blows through said porous media in a substantially vertical direction and fluidizes said pesticide in said upper chamber;
   (d) means for outletting said pesticide from said outlet orifice and to a utilization point, wherein pesticide particles having a particle size smaller than a predetermined size are dispensed and particles having a particle size larger than said predetermined size are retained in said upper chamber; and
   (e) means for adjusting said outlet means whereby said outlet means may be moved relative to the level of said pesticide in said upper chamber.

6. The apparatus according to claim 5, wherein said outlet means comprises an outlet tube operatively connected to said upper end of said housing, said outlet tube including a control valve, wherein pesticide is dispensed when said control valve is activated.

7. The apparatus according to claim 6, wherein said adjustment means includes a dip tube having an upper end operatively connected to said outlet tube and a lower end having a plurality of apertures in the bottom and sides of said dip tube which communicate with said upper chamber, the position of said dip tube being adjustable by means of a collet assembly, wherein said fluidized pesticide having said predetermined particle size travel through said apertures.

8. A method for dispensing powdered pesticide comprising the steps of:
   (a) placing a quantity of powdered pesticide in an upper chamber of a dispenser, said pesticide being supported upon a porous media which forms a bottom for said upper chamber;

(b) adjusting an outlet relative to the level of said pesticide;

(c) supplying pressurized air to a lower chamber of said dispenser, so as to fluidize said powdered pesticide in said upper chamber by airflow through said porous media and into said upper chamber; and (d) blowing pesticide particles having a particle size smaller than a predetermined size through said outlet, wherein particles having a particle size larger than a predetermined size remain in said upper chamber.

9. The method according to claim 8, further comprising the step of adjusting air pressure in an air inlet line with a pressure gauge and regulator.

10. The method according to claim 9, further comprising the steps of:

(a) discontinuing airflow through said dispenser when fluidized powdered pesticide substantially ceases to travel into said outlet line; and (b) removing from said dispenser particles having a particle size larger than a predetermined size which remains in said dispenser.

11. The method according to claim 10, further comprising the steps of:

(a) grinding remaining particles to a size smaller than said predetermined size; and (b) placing said ground powdered pesticide in said upper chamber of said dispenser for fluidization and dispensing.

* * * * *